(12) United States Patent
Tang

(10) Patent No.: US 9,376,888 B2
(45) Date of Patent: Jun. 28, 2016

(54) DIVERTING RESIN FOR STABILIZING PARTICULATE IN A WELL

(71) Applicant: Halliburton Energy Services, Inc., Houston, TX (US)

(72) Inventor: Tingji Tang, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/384,562

(22) PCT Filed: Aug. 8, 2013

(86) PCT No.: PCT/US2013/054108
§ 371 (c)(1),
(2) Date: Sep. 11, 2014

(87) PCT Pub. No.: WO2015/020656
PCT Pub. Date: Feb. 12, 2015

(65) Prior Publication Data
US 2015/0252649 A1    Sep. 10, 2015

(51) Int. Cl.
*E21B 33/138* (2006.01)
*C09K 8/80* (2006.01)
*E21B 43/267* (2006.01)
*E21B 21/06* (2006.01)
*C09K 8/56* (2006.01)
*C09K 8/565* (2006.01)
*C09K 8/57* (2006.01)
*C09K 8/575* (2006.01)

(52) U.S. Cl.
CPC ............... *E21B 33/138* (2013.01); *C09K 8/56* (2013.01); *C09K 8/565* (2013.01); *C09K 8/572* (2013.01); *C09K 8/5751* (2013.01); *C09K 8/80* (2013.01); *E21B 21/062* (2013.01); *E21B 43/267* (2013.01); *C09K 2208/18* (2013.01)

(58) Field of Classification Search
None
See application file for complete search history.

(56) References Cited

U.S. PATENT DOCUMENTS 2,410,219 A    10/1946   Langstroth
3,998,269 A *  12/1976   Lybarger ............... 166/250.14
(Continued)

OTHER PUBLICATIONS

Josue Villesca, Gerald Glasbergen, David Attaway, "Measuring Fluid Placement of Sand-Consolidation Treatments Using DTS," SPE 144432, SPE European Formation Damage Conference, Noordwijk, The Netherlands, Jun. 7-10, 2011, 8 pages.

(Continued)

*Primary Examiner* — Angela M DiTrani
*Assistant Examiner* — Anuradha Ahuja
(74) *Attorney, Agent, or Firm* — Craig W. Roddy; Baker Botts L.L.P.

(57) ABSTRACT

A method of treating a treatment zone of a subterranean formation penetrated by a wellbore of a well, the method including: (A) introducing into the treatment zone a first particulate, wherein: (i) the first particulate comprises a first degradable material; (ii) the first particulate comprises a first particulate size selected to bridge the pore throats of a first matrix permeability of the treatment zone; and (B) introducing into the treatment zone a second particulate, wherein: (i) the second particulate comprises a second degradable material; (ii) the second particulate comprises a second particulate having a second particulate size selected to bridge the pore throats of a second matrix permeability of the treatment zone; and (C) introducing into the treatment zone a liquid resin, wherein the liquid resin is introduced into the treatment zone.

22 Claims, 1 Drawing Sheet

(56) References Cited

U.S. PATENT DOCUMENTS

| | | | |
|---|---|---|---|
| 4,042,031 A * | 8/1977 | Knapp | 166/276 |
| 4,527,628 A | 7/1985 | Dill et al. | |
| 4,665,988 A * | 5/1987 | Murphey et al. | 166/295 |
| 4,829,100 A * | 5/1989 | Murphey et al. | 523/131 |
| 5,232,961 A * | 8/1993 | Murphey et al. | 523/414 |
| 6,016,870 A * | 1/2000 | Dewprashad et al. | 166/295 |
| 6,311,773 B1 | 11/2001 | Todd et al. | |
| 6,632,778 B1 | 10/2003 | Ayoub et al. | |
| 7,066,260 B2 | 6/2006 | Sullivan et al. | |
| 7,211,547 B2 * | 5/2007 | Nguyen | 507/202 |
| 7,265,079 B2 | 9/2007 | Willberg et al. | |
| 7,506,689 B2 * | 3/2009 | Surjaatmadja et al. | 166/280.2 |
| 7,598,208 B2 | 10/2009 | Todd | |
| 8,261,833 B2 | 9/2012 | Nguyen et al. | |
| 8,657,003 B2 | 2/2014 | Welton et al. | |
| 2004/0261996 A1 | 12/2004 | Munoz, Jr. et al. | |
| 2005/0051363 A1 * | 3/2005 | Munoz et al. | 175/72 |
| 2005/0059557 A1 * | 3/2005 | Todd et al. | 507/110 |
| 2005/0205265 A1 | 9/2005 | Todd et al. | |
| 2005/0252659 A1 * | 11/2005 | Sullivan et al. | 166/280.1 |
| 2006/0065397 A1 | 3/2006 | Nguyen et al. | |
| 2006/0157248 A1 * | 7/2006 | Hoefer et al. | 166/300 |
| 2006/0185848 A1 * | 8/2006 | Surjaatmadja et al. | 166/280.2 |
| 2007/0032386 A1 * | 2/2007 | Abad et al. | 507/201 |
| 2008/0011478 A1 | 1/2008 | Welton et al. | |
| 2008/0173448 A1 | 7/2008 | Nguyen et al. | |
| 2009/0029878 A1 * | 1/2009 | Bicerano | 507/107 |
| 2009/0078419 A1 * | 3/2009 | Dusterhoft | 166/295 |
| 2009/0095535 A1 * | 4/2009 | Nguyen | 175/72 |
| 2010/0216672 A1 | 8/2010 | Todd | |
| 2010/0263870 A1 * | 10/2010 | Willberg et al. | 166/305.1 |
| 2010/0267591 A1 | 10/2010 | Todd et al. | |
| 2011/0028358 A1 | 2/2011 | Welton et al. | |
| 2011/0048708 A1 * | 3/2011 | Glasbergen et al. | 166/281 |
| 2011/0168449 A1 * | 7/2011 | Dusterhoft et al. | 175/72 |
| 2011/0284245 A1 * | 11/2011 | Crandall et al. | 166/386 |
| 2013/0306317 A1 * | 11/2013 | Karadkar et al. | 166/305.1 |

OTHER PUBLICATIONS

P.D. Nguyen, R.D. Richman, "Foaming Aqueous-Based Curable Treatment Fluids Enhances Placement and Consolidation Performance," SPE 151002, SPE International Symposium and Exhibition on Formation Damage Control, Lafayette, Louisiana, USA, Feb. 15-17, 2012, 16 pages.

International Search Report and Written Opinion, PCT/US2013/054108, date of mailing May 12, 2014, 8 pages.

Albertsson et al., "Aliphatic Polyesters: Synthesis, Properties and Applications", Advances in Polymer Science, vol. 157, Springer-Verlag Berlin Heidelberg 2002 (162 pages).

International Preliminary Report on Patentability issued in related PCT application No. PCT/US/2013/054108, mailed on Feb. 18, 2016 (6 pages).

* cited by examiner

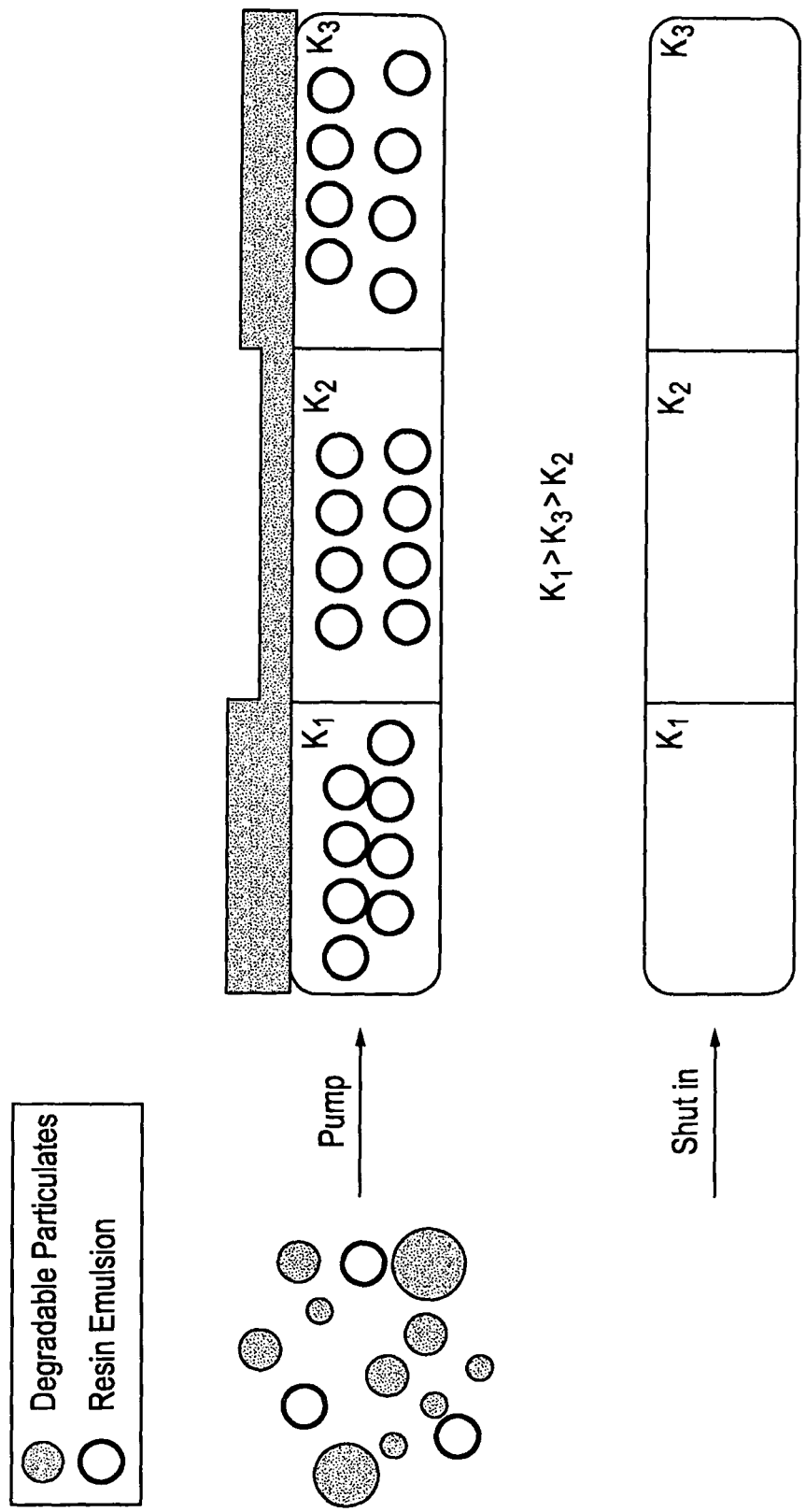

DIVERTING RESIN FOR STABILIZING PARTICULATE IN A WELL

CROSS-REFERENCE TO RELATED APPLICATIONS

Not applicable.

TECHNICAL FIELD

This disclosure is in the field of producing crude oil or natural gas from subterranean formations. More specifically, the disclosure generally relates to fluids and methods of stabilizing particulates in a treatment zone of a subterranean formation penetrated by a wellbore of a well.

BACKGROUND

Oil or gas is obtained from a subterranean formation by drilling a wellbore that penetrates a hydrocarbon-bearing formation. It is desirable to maximize both the rate of flow and the overall amount of flow of hydrocarbon from the subterranean formation to the surface.

Wellbores often penetrate subterranean formations that contain unconsolidated particulates that may migrate when oil, gas, water, or other fluids are produced or flowed back from the subterranean formation.

One way that the rate of hydrocarbon flow and the overall amount of hydrocarbon flow can be reduced is by fines production or sand migration in the formation or by precipitation. The relatively high velocity in the permeable matrix of the subterranean formation near the wellbore is sometimes sufficient to mobilize particulates. These particulates can be carried and then plug flow channels in the formation, a proppant pack, or a gravel pack. It is desirable to minimize fines or sand migration, since such particulates block flow paths, choking the potential production of the well. In addition, such particulates can damage downhole and surface equipment, such as screens, pumps, flow lines, storage facilities, etc.

Devices such as screens and slotted liners are often used to provide support for these unconsolidated formations to inhibit formation collapse. Usually, the annulus around the support device is gravel packed to reduce the presence of voids between the device and the borehole. Typically, such gravel packing operations involve the pumping and placement of a quantity of a desired size of particulate material into the annulus between the tubular device and the borehole of the wellbore. Gravel packing forms a filtration bed near the well bore that acts as a physical barrier to the transport of unconsolidated formation fines with the production of hydrocarbons. These support devices provide support for the wellbore and gravel packing and prevent some fines from entering the hydrocarbon flow into the well.

A common type of gravel packing operation involves placing a gravel pack screen in the well bore and packing the surrounding annulus between the screen and the well bore with gravel of a specific mesh size designed to prevent the passage of formation sand or fines. The gravel pack screen is generally a filter assembly used to retain the gravel placed during gravel pack operation. A wide range of sizes and screen configurations are available to suit the characteristics of the gravel pack sand. Similarly, a wide range of gravel sizes is available to suit the characteristics of the unconsolidated or poorly consolidated particulates in the subterranean formation. The resulting structure presents a barrier to migrating sand from the formation while still permitting fluid flow.

Gravel packs can be time consuming and expensive to install. Due to the time and expense needed, it is sometimes desirable to place a screen without the gravel and, particularly in cases in which an expandable screen is being placed, it may be unrealistic to place a bed of gravel between the expandable screen and the well bore. Even in circumstances in which it is practical to place a screen without a gravel pack, it is often difficult to determine an appropriate screen size to use as formation sands tend to have a wide distribution of sand grain sizes. When small quantities of sand are allowed to flow through a screen, screen erosion becomes a significant concern. As a result, the placement of gravel as well as the screen is often necessary to control the formation sands.

Another method used to control particulates in unconsolidated formations involves consolidating a subterranean producing zone into hard, permeable masses. Consolidation of a subterranean formation zone often involves applying a resin followed by a spacer fluid and then a hardener. Such resin application may be problematic or impractical for treating long intervals of unconsolidated regions due to the difficulty in determining whether the entire interval has been successfully treated with both the resin and the external catalyst. For long intervals, the placement of a consolidation resin along the formation is quite challenging due to the fact that most of aqueous resin will flow into the high permeability formation zone, resulting in the low permeability zone receiving less than the desired consolidation treatment.

Preventing formation sand and fines from migrating from an unconsolidated formation has always been a challenge.

GENERAL DESCRIPTION OF EMBODIMENTS

This disclosure provides a method of treating a treatment zone of a subterranean formation penetrated by a wellbore of a well, the method comprising: (A) introducing into the treatment zone a first particulate, wherein: (i) the first particulate comprises a first degradable material; (ii) the first particulate comprises a first particulate having a first particulate D50 size selected to bridge the pore throats of a first matrix permeability of the treatment zone where the first matrix permeability is in the range of about 10,000 mD to about 100 mD; and (B) introducing into the treatment zone a second particulate, wherein: (i) the second particulate comprises a second degradable material; (ii) the second particulate comprises a second particulate having a D50 size selected to bridge the pore throats of a second matrix permeability of the treatment zone, where the second matrix permeability being in the range of about 5,000 mD to about 50 mD subject to the second matrix permeability also being less than about one-half the first matrix permeability; (iii) the first degradable material and the second degradable material can be the same or different; and (iv) the second particulate is introduced into the treatment zone simultaneously with the first particulate or separately from the first particulate but at least before the first degradable material of the first particulate degrades more than 50% by weight in the treatment zone; and (C) introducing into the treatment zone a liquid resin, wherein the liquid resin is introduced into the treatment zone: (i) simultaneously with the first particulate or separately from the first particulate but at least before the first degradable material of the first particulate degrades more than 50% by weight in the treatment zone; and (ii) simultaneously with the second particulate or separately from the second particulate but at least before the second degradable material of the second particulate degrades more than 50% by weight in the treatment zone.

In an embodiment, the second matrix permeability is less than about one-third of the first matrix permeability.

In another embodiment, the method additionally comprises: introducing into the treatment zone a third particulate, wherein: (i) the third particulate comprises a third degradable material; (ii) the third particulate comprises a third particulate having a third particulate D50 size selected to bridge the pore throats of a third matrix permeability of the treatment zone, where the third matrix permeability is in the range of about 2,500 mD to about 50 mD subject to the third matrix permeability also being less than about one-half the second matrix permeability; (iii) the third degradable material is the same or different than the first degradable material or the second degradable material; (iv) the third particulate is introduced into the treatment zone simultaneously with the first particulate or separately from the first particulate but at least before the first degradable material of the first particulate degrades more than 50% by weight in the treatment zone; (v) the third degradable material is introduced into the treatment zone simultaneously with the second particulate or separately from the second particulate but at least before the second degradable material of the second particulate degrades more than 50% by weight in the treatment zone; and (vi) the liquid resin is introduced into the treatment zone simultaneously with the third particulate or separately from the third particulate but at least before the third degradable material of the third particulate degrades more than 50% by weight in the treatment zone.

In an embodiment, the third matrix permeability is less than about one-third of the second matrix permeability.

As a general approximation, for a portion of a carbonate or sandstone formation having a permeability in the range of about 10,000 mD to about 50 mD, the numerical value of the square root of the permeability in mD is about the pore throat size of the formation in microns. This approximation does not apply to formations having ultra-low permeability, such as shale formations.

In various embodiments, the first, second, and third particulate size ranges are independently selected to be within an overall size range of about 100 micron to about 1 micron.

In various embodiments, (a) the first particulate size is selected to have a D50 measured in microns that is in the range of about one-third to about two-thirds of the numerical value of the square root of the permeability of the first matrix permeability measured in mD; (b) the second particulate size is selected to have a D50 measured in microns that is in the range of about one-third to about two-thirds of the numerical value of the square root of the permeability of the second matrix permeability measured in mD; and (c) the third particulate size (if any) is selected to have a D50 measured in microns that is in the range of about one-third to about two-thirds of the numerical value of the square root of the permeability of the third matrix permeability measured in mD.

In various embodiments, the first particulate, the second particulate, and the third particulate (if any) are obtained separately and then mixed into one or more treatment fluids for use according to the disclosure.

In various embodiments, the first, second, and third particulates independently comprise at least about 50% by weight of the first, second, and third degradable materials, respectively. Preferably, the first, second, and third particulates independently consist essentially of the first, second, and third degradable materials, respectively.

In various embodiments, the first, second, and third degradable materials are independently selected from the group consisting of: degradable polymeric materials, degradable anionic compounds that can bind a multi-valent metal (for example, scale inhibiting chemicals and scale chelating chemicals), solid materials that degrade by sublimation (for example, solid azo compounds having an azo component and a methylenic component), and degradable dehydrated compounds (for example, solid anhydrous borate materials).

Examples of degradable polymeric materials can be independently selected from the group consisting of: polyesters, polyanhydrides, and polyphosphazenes, and polyphosphoesters. More specifically, examples of degradable polymeric materials can be independently selected from the group consisting of: polylactic acid, polyglycolic acid, polyhydroxybutyric acids, and PCL.

As used herein, the term "liquid resin" or "resinous material" means a material that is a viscous liquid and has a sticky or tacky characteristic when tested under Standard Laboratory Conditions. A resinous material can include a resin, a tackifying agent, and any combination thereof in any proportion. The resin can be or include a curable resin. It should be understood that a liquid resin can, in some embodiments, be hardened or cured. A catalyst for this purpose, which is sometimes referred to as a hardener, may be used for this purpose.

A liquid resin can be selected from natural resins, synthetic resins, and any combination thereof. Natural resins include, but are not limited to, shellac. Synthetic resins include, but are not limited to, epoxies, furans, phenolics, and furfuryl alcohols, and any combination thereof.

In various embodiments, the liquid resin can be selected from the group consisting of: epoxy resin, phenolic resin, furan resin, and polysilicone. More specifically, the liquid resin can be selected from the group consisting of: bisphenol A ("BPA"), bisphenol F ("BPF"), novolac epoxy resin, and alphatic epoxy resin.

Examples of commercially available resins include SANDTRAP™ and EXPEDITE™ products sold by Halliburton Energy Services, Inc. of Duncan, Okla.

By way of another example, the resin can by a tackifying agent, which acts to consolidate and help hold together particulate. The tackifying-agent-coated material in the subterranean formation tends to cause small particulates, such as fines, to stick to the outside of the surface of the coated material. This helps prevent the fines from flowing with a fluid, which could potentially clog the openings to pores.

Tackifying agents include, but are not limited to, polyamides, polyesters, polyethers and polycarbamates, polycarbonates, and any combination thereof in any proportion. An example of a suitable commercially available tackifying agent is the SANDWEDGE™ product sold by Halliburton Energy Services, Inc. of Duncan, Okla.

In various embodiments, the methods can additionally include introducing a hardener for the liquid resin, wherein the hardener is introduced simultaneously with the liquid resin or at least before flowing back any downhole fluid from the subterranean formation that contains the liquid resin. For example, the hardener can selected from the group consisting of: amines, anhyrides, phenols, and thiols. More specifically, the hardener can be selected from the group consisting of: diethylene triamine, ethylene diamine, and polyethylene imine.

In various embodiments, the methods can additionally include introducing a silane coupling agent for the liquid resin, wherein the silane coupling agent is introduced simultaneously with the liquid resin or before flowing back any downhole fluid from the subterranean formation that contains the liquid resin. A silane coupling agent may be used, among other things, to act as a mediator to help bond resin to the formation particulate surfaces. For example, the silane coupling agent can be selected from the group consisting of: aliphatic silanes, and aromatic silanes. More specifically, examples of silane coupling agents that can be utilized include, but are not limited to, n-2-(aminoethyl)-3-aminopropyltrimethoxysilane, 3-glycidoxypropyltrimethoxysilane, and n-beta-(aminoethyl)-gamma-aminopropyl trimethoxysilane, 3-aminopropyltrimetoxysilane, and 3-aminopropyltrimethoxysilane. The silane coupling agent used is included in the fluid in an amount capable of sufficiently bonding resin to particulates, such as a proppant, gravel, or formation fines. In some embodiments of the disclosure, the silane coupling agent used is included in the range of from about 0.01% to about 3% by weight of the liquid resin.

In various embodiments, each of the first particulate, the second particulate, the third particulate, and the resin are introduced into the treatment zone as a dispersion in one or more water-based treatment fluids. In various embodiments or preferably, the aqueous phase is the continuous phase of the fluids. The aqueous phase can optionally include one or more dissolved inorganic salts, for example, KCl. The aqueous phase of the fluid can optionally include seawater or a brine.

In various embodiments, at least one of the one or more treatment fluids comprises a viscosity-increasing agent (for suspending a dispersion of the particulates or liquid resin).

In various embodiments, one or more surfactants can be used to help control the tackiness or other characteristics of the liquid resin in a fluid or to help disperse the liquid resin in water. Any surfactant compatible with the liquid resin and capable of facilitating the coating of the resin on the subterranean particles and aiding the treatment fluid in flowing to the contact points between adjacent particulates in the formation may be optionally included according to the present disclosure. Such surfactants include, but are not limited to, ethoxylated nonyl phenol phosphate esters, mixtures of one or more cationic surfactants, one or more non-ionic surfactants, and an alkyl phosphonate surfactant. Suitable mixtures of one or more cationic and nonionic surfactants are described in U.S. Pat. No. 6,311,773 issued to Todd et al. on Nov. 6, 2001. A C12-C22 alkyl phosphonate surfactant is an example. The inclusion of a cationic surfactant is preferred. In embodiments in which a surfactant is included, the one or more surfactants can be present in the treatment fluid in a concentration sufficient to prevent incompatibility with formation fluids, other treatment fluids, or well bore fluids. In an embodiment where liquid surfactants are used, the surfactants are generally present in a concentration in the range of from about 0.01% to about 15% by volume of the aqueous phase of the treatment fluid. In one embodiment, the liquid surfactants are present in a concentration in the range of from about 0.1% to about 5.0% by volume of the aqueous phase of the treatment fluid. In embodiments where powdered surfactants are used, the surfactants may be present in a concentration in the range of from about 0.001% to about 0.5% by weight of the aqueous phase of the treatment fluid. In various embodiments, at least one of the one or more treatment fluids that comprises the liquid resin additionally comprises a surfactant that is an emulsifier.

In various embodiments, the first particulate, second particulate, and third particulate are each in at least a sufficient amount in the one or more water-based treatment fluids to contribute to the formation of a first filtercake, a second filtercake, and a third filtercake, respectively, on a first surface of a first portion of the subterranean formation having the first matrix permeability, on a second surface of a second portion of the subterranean formation having the second matrix permeability, and a third surface of a third portion of the subterranean formation having the third matrix permeability, respectively.

In various embodiments according the invention, the treatment zone can be an unconsolidated or weakly consolidated subterranean formation. The treatment zone can be, for example, is in a subterranean formation having loose particulate of silicon dioxide such as sand or quartz particles. For example, the subterranean formation can be a sandstone formation. Preferably, the sandstone formation has at least 70% sandstone material by weight.

The subterranean formation can be, for example, the subterranean formation can be a reservoir having a permeability of greater than about 50 mD. Typically, an oil producing zone has a permeability of less than about 10 Darcy, and more typically less than about 2 Darcy.

Preferably, the treatment zone and job conditions are selected such that the design temperature is in the range of about 60° C. to about 200° C.

The methods of the invention can optionally include positioning a mechanical sand control device in the treatment zone. Preferably, the mechanical sand control device is selected from the group consisting of: a perforated liner, a slotted pipe, a wire-wrapped screen, a non-expandable screen, and an expandable screen. In addition, the mechanical sand control device can optionally be gravel packed. Introducing the one or more treatment fluids can be performed either before, during, or after a sand screen installation or gravel packing are completed. It is beneficial to provide a method that transforms small formation sand or fines into larger aggregates. Preferably, this does not reduce permeability of the formation, and the permeability may be increased. This enhances the retention of fines behind the screen without plugging or eroding it.

After the step of introducing one or more treatment fluids according to the disclosure, the zone is shut in to allow time for the degradable material to degrade in the well under the design conditions. This preferably occurs with time under the temperature, pressure, and other conditions in the zone. Preferably, the step of shutting in is for at least a sufficient time for at least 50% by weight of the degradable material to degrade in the treatment zone under the design conditions.

The method can include the step of: after the steps of shutting in and installing the mechanical sand control device, producing fluid from the subterranean formation through the mechanical sand control device.

The various methods according to the disclosure can stabilize formation particulates of sand and fines by consolidating the particulates in the formation, thereby preventing the fines from migrating. It is believed that the consolidation does not substantially reduce the permeability of the subterranean formation or damage the subterranean formation.

The methods of the present disclosure are capable of substantially stabilizing the particulates such that loose or weakly consolidated particulates are prevented from shifting or migrating once the treatment is complete. This is particularly significant in the context of portions of formations where it is desirable to control the particulates without having to use a gravel pack. In such situations, the methods of the present disclosure including the use of a screen or liner (which may be an expandable or traditional screen or a perforated or slotted liner, or any similar device known in the art) can act to control particulates to a sufficiently high degree that a gravel pack becomes unnecessary.

Thus, according to the methods of the present disclosure, and, optionally, a screen or liner, the method creates a stable, permeable region around the wellbore that resists particulate migration. The screen or liner can be used, for example, to provide mechanical support to prevent borehole collapse. Such embodiments may make the use of screen-only or liner-only (no gravel pack) completions functional over a much wider range of formation properties than previously thought possible.

In addition, the methods can be used as a remedial treatment to be injected into a treatment zone through a proppant or gravel pack of a previously performed fracturing treatment or gravel pack.

The methods can be performed in vertical, inclined, or horizontal wellbores, and in open-hole or under-reamed completions as well as in cased wells. If the method is to be carried out in a cased wellbore, the casing is perforated to provide for fluid communication with a zone of interest in the subterranean formation.

The method can optionally include the step of: before or after the step of introducing the one or more treatment fluids, introducing a fracturing fluid into the wellbore at a pressure sufficient to create at least one fracture in the subterranean formation. For example, the composition can be used as a prior treatment to hydraulic fracturing.

These and other embodiments of the disclosure will be apparent to one skilled in the art upon reading the following detailed description. While the disclosure is susceptible to various modifications and alternative forms, specific embodiments thereof will be described in detail and shown by way of example. It should be understood, however, that it is not intended to limit the disclosure to the particular forms disclosed.

BRIEF DESCRIPTION OF THE DRAWING

The accompanying drawing is incorporated into the specification to help illustrate examples according to a presently preferred embodiment of the disclosure.

FIG. 1 is a schematic illustration of a self-diverting resin fluid and method, wherein a treatment fluid comprises, for example, three different sizes of degradable particulate and a liquid resin for consolidating particulate in a subterranean formation.

DETAILED DESCRIPTION OF PRESENTLY PREFERRED EMBODIMENTS AND BEST MODE

Definitions and Usages
General Interpretation

The words or terms used herein have their plain, ordinary meaning in the field of this disclosure, except to the extent explicitly and clearly defined in this disclosure or unless the specific context otherwise requires a different meaning.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed. As used herein, the words "consisting essentially of," and all grammatical variations thereof are intended to limit the scope of a claim to the specified materials or steps and those that do not materially affect the basic and novel characteristic(s) of the claimed invention.

The indefinite articles "a" or "an" mean one or more than one of the component, part, or step that the article introduces.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to h," and any similar expressions, where "a" and "b" represent numerical values of degree or measurement) is to be understood to set forth every number and range encompassed within the broader range of values.

Oil and Gas Reservoirs

In the context of production from a well, "oil" and "gas" are understood to refer to crude oil and natural gas, respectively. Oil and gas are naturally occurring hydrocarbons in certain subterranean formations.

A "subterranean formation" is a body of rock that has sufficiently distinctive characteristics and is sufficiently continuous for geologists to describe, map, and name it.

A subterranean formation having a sufficient porosity and permeability to store and transmit fluids is sometimes referred to as a "reservoir."

A subterranean formation containing oil or gas may be located under land or under the seabed off shore. Oil and gas reservoirs are typically located in the range of a few hundred feet (shallow reservoirs) to a few tens of thousands of feet (ultra-deep reservoirs) below the surface of the land or seabed.

A consolidated formation is a geologic material for which the particles are stratified (layered), cemented, or firmly packed together (hard rock); usually occurring at a depth below the ground surface. An unconsolidated formation is a sediment that is loosely arranged or unstratified (not in layers) or whose particles are not cemented together (soft rock); occurring either at the ground surface or at a depth below the surface. In an unconsolidated or weakly consolidated formation, some particulates are insufficiently bonded in the formation to withstand the forces produced by the production or flowback of fluids through the matrix of the formation.

As used herein, a subterranean formation having greater than about 50% by weight of inorganic siliceous materials (e.g., sandstone) is referred to as a "sandstone formation."

As used herein, a subterranean formation having greater than about 50% by weight of inorganic carbonate materials (e.g., calcium or magnesium carbonate rock) is referred to as a "carbonate formation."

There are conventional and non-conventional types of reservoirs. In a conventional reservoir, the hydrocarbons flow to the wellbore in a manner that can be characterized by flow through permeable media, where the permeability may or may not have been altered near the wellbore, or flow through permeable media to a permeable (conductive), bi-wing fracture placed in the formation. A conventional reservoir would typically have a permeability greater than about 1 milliDarcy (equivalent to about 1,000 microDarcy).

Well Servicing

To produce oil or gas from a reservoir, a wellbore is drilled into a subterranean formation, which may be the reservoir or adjacent to the reservoir.

Generally, well services include a wide variety of operations that may be performed in oil, gas, geothermal, or water wells, such as drilling, cementing, completion, and intervention. Well services are designed to facilitate or enhance the production of desirable fluids such as oil or gas from or through a subterranean formation. A well service usually involves introducing a fluid into a well.

Drilling, completion, and intervention operations can include various types of treatments that are commonly performed on a well or subterranean formation. During completion or intervention, stimulation is a type of treatment performed to enhance or restore the productivity of oil and gas from a well. Stimulation treatments fall into two main groups: hydraulic fracturing and matrix treatments. Fracturing treatments are performed above the fracture pressure of the subterranean formation to create or extend a highly permeable flow path between the formation and the wellbore. Matrix treatments are performed below the fracture pressure of the formation. Other types of completion or intervention treatments can include, for example, gravel packing, consolidation, and controlling excessive water production.

Wells and Fluids

A "well" includes a wellhead and at least one wellbore from the wellhead penetrating the earth. The "wellhead" is the surface termination of a wellbore, which surface may be on land or on a seabed.

A "well site" is the geographical location of a wellhead of a well. It may include related facilities, such as a tank battery, separators, compressor stations, heating or other equipment, and fluid pits. If offshore, a well site can include a platform.

The "wellbore" refers to the drilled hole, including any cased or uncased portions of the well or any other tubulars in the well. A wellbore can have portions that are vertical, horizontal, or anything in between, and it can have portions that are straight, curved, or branched. As used herein, "uphole," "downhole," and similar terms are relative to the direction of the wellhead, regardless of whether a wellbore portion is vertical or horizontal.

A wellbore can be used as a production or injection wellbore. A production wellbore is used to produce hydrocarbons from the reservoir. An injection wellbore is used to inject a fluid, for example, liquid water or steam, to drive oil or gas to a production wellbore.

As used herein, introducing "into a well" means introducing at least into and through the wellhead. According to various techniques known in the art, tubulars, equipment, tools, or fluids can be directed from the wellhead into any desired portion of the wellbore.

As used herein, unless the context otherwise requires, a treatment fluid refers to the specific properties and composition of a fluid at the time the fluid is being introduced into a well. In addition, it should be understood that, during the course of a well operation such as drilling, cementing, completion, or intervention, or during a specific treatment, the specific properties and composition of a type of fluid can be varied or several different types of fluids can be used.

For example, the compositions can be varied to adjust viscosity or elasticity of the fluids to accommodate changes in the concentrations of particulate to be carried downhole. It can also be desirable to accommodate expected changes in temperatures encountered by the fluids during the course of the treatment. By way of another example, it can be desirable to accommodate the longer duration that an earlier-introduced treatment fluid may need to maintain viscosity before breaking compared to the shorter duration that a later-introduced treatment fluid may need to maintain viscosity before breaking. Changes in concentration of a particulate, viscosity-increasing agent, breaker, or other additives in the various treatment fluids of a treatment operation can be made in stepped changes of concentrations or ramped changes of concentrations.

As used herein, the word "treatment" refers to any treatment for changing a condition of a portion of a wellbore or a subterranean formation adjacent a wellbore; however, the word "treatment" does not necessarily imply any particular treatment purpose. A treatment usually involves introducing a fluid for the treatment, in which case it may be referred to as a treatment fluid, into a well. As used herein, a "treatment fluid" is a fluid used in a treatment. The word "treatment" in the term "treatment fluid" does not necessarily imply any particular treatment or action by the fluid.

In the context of a well or wellbore; a "portion" or "interval" refers to any downhole portion or interval along the length of a wellbore or of a fracture.

A "zone" refers to an interval of rock along a wellbore that is differentiated from uphole and downhole zones based on hydrocarbon content or other features, such as permeability, composition, perforations, or other fluid communication with the wellbore, faults, or fractures. A zone of a wellbore that penetrates a hydrocarbon-bearing zone that is capable of producing hydrocarbon is referred to as a "production zone." A "treatment zone" refers to an interval of rock along a wellbore into which a fluid is directed to flow from the wellbore. As used herein, "into a treatment zone" means into and through the wellhead and, additionally, through the wellbore and into the treatment zone.

The term "damage" as used herein regarding a subterranean formation refers to undesirable deposits in a subterranean formation that may reduce its permeability. Scale, skin, gel residue, and hydrates are contemplated by this term.

The term "sand control device" is used generically herein and is meant to include and cover all types of similar structures which are commonly used in gravel pack well completions which permit flow of fluids through the "screen" while blocking the flow of particulates (e.g., commercially-available screens; slotted or perforated liners or pipes; sintered-metal screens; sintered-sized, mesh screens; screened pipes; pre-packed screens, radially-expandable screens and/or liners; or combinations thereof).

A "design" refers to the estimate or measure of one or more parameters planned or expected for a particular fluid or stage of a well service or treatment. For example, a fluid can be designed to have components that provide a minimum density or viscosity for at least a specified time under expected downhole conditions. A well service may include design parameters such as fluid volume to be pumped, required pumping time for a treatment, or the shear conditions of the pumping.

The term "design temperature" refers to an estimate or measurement of the actual temperature at the downhole environment during the time of a treatment. For example, the design temperature for a well treatment takes into account not only the bottom hole static temperature ("BHST"), but also the effect of the temperature of the fluid on the BHST during treatment. The design temperature for a fluid is sometimes referred to as the bottom hole circulation temperature ("BHCT"). Because fluids may be considerably cooler than BHST, the difference between the two temperatures can be quite large. Ultimately, if left undisturbed a subterranean formation will return to the BHST.

Permeability

Permeability refers to how easily fluids can flow through a material. For example, if the permeability is high, then fluids will flow more easily and more quickly through the material. If the permeability is low, then fluids will flow less easily and more slowly through the material. As used herein, unless otherwise specified, permeability is measured with light oil having an API gravity of greater than 31.1 degrees.

For oil wells, "high permeability" means the matrix of a subterranean formation has a permeability of at least 30 mD and "low permeability" means the matrix has a permeability of less than 10 mD. For gravel packing, "high permeability" means the matrix of a subterranean formation has a permeability of at least 500 mD and "low permeability" means the matrix has a permeability of less than 50 mD.

Phases and Physical States

As used herein, "phase" is used to refer to a substance having a chemical composition and physical state that is distinguishable from an adjacent phase of a substance having a different chemical composition or a different physical state.

As used herein, if not other otherwise specifically stated, the physical state or phase of a substance (or mixture of substances) and other physical properties are determined at a temperature of 77° F. (25° C.) and a pressure of 1 atmosphere (Standard Laboratory Conditions) without applied shear.

Particles and Particulates

As used herein, a "particle" refers to a body having a finite mass and sufficient cohesion such that it can be considered as an entity but having relatively small dimensions. A particle can be of any size ranging from molecular scale to macroscopic, depending on context.

As used herein, particulate or particulate material refers to matter in the physical form of distinct particles in a solid or liquid state (which means such an association of a few atoms or molecules). As used herein, a particulate is a grouping of particles having similar chemical composition and particle size ranges anywhere in the range of about 0.5 micrometer (500 nm), for example, microscopic clay particles, to about 3 millimeters, for example, large grains of sand.

A particulate can be of solid or liquid particles. As used herein, however, unless the context otherwise requires, particulate refers to a solid particulate.

It should be understood that the terms "particle" and "particulate," includes all known shapes of particles including substantially rounded, spherical, oblong, ellipsoid, rod-like, fiber, polyhedral (such as cubic materials), etc., and mixtures thereof. For example, the term "particulate" as used herein is intended to include solid particles having the physical shape of platelets, shavings, flakes, ribbons, rods, strips, spheroids, toroids, pellets, tablets or any other physical shape.

A particulate will have a particle size distribution ("PSD"). As used herein, "the size" of a particulate can be determined by methods known to persons skilled in the art.

One way to define the particle size distribution is to cite distribution values such as the d(0.10), d(0.50), or d(0.90). The d(0.50), which is sometimes referred to as the "D50" or the median particle size, is defined as the diameter where half of the particles are smaller and half are larger than the size. Similarly, 10 percent of the distribution lies below the d(0.10) or "D10" size, and 90 percent of the distribution lies below the d(0.90) or "D90" size. if not otherwise stated, a reference to a single particle size means about the mid-point of the industry-accepted mesh size range for such a particulate.

Dispersions and Solutions

A dispersion is a system in which particles of a substance of one chemical composition and physical state are dispersed in another substance of a different chemical composition or physical state. In addition, phases can be nested. If a substance has more than one phase, the most external phase is referred to as the continuous phase of the substance as a whole, regardless of the number of different internal phases or nested phases.

Fluids

A fluid can be a homogeneous or heterogeneous. In general, a fluid is an amorphous substance that is or has a continuous phase of particles that are smaller than about 1 micrometer that tends to flow and to conform to the outline of its container.

Every fluid inherently has at least a continuous phase. A fluid can have more than one phase. The continuous phase of a treatment fluid is a liquid under Standard Laboratory Conditions.

The term "water" is used generally herein to include fresh water or brine, unless the context otherwise requires.

As used herein, the term "brine" is intended to include, unless the context otherwise requires, any aqueous solution having greater than 1,000 ppm total dissolved inorganic salts. Oil field brines commonly contain varying concentrations of inorganic salts, e.g., sodium chloride, calcium chloride, and magnesium salts. Aqueous solutions are frequently modified by addition of potassium chloride to stabilize the subsurface clay. Accordingly, potassium chloride is frequently encountered in brines.

As used herein, a "water-based" fluid means that water or an aqueous solution is the dominant material of the continuous phase, that is, greater than 50% by weight, of the continuous phase of the fluid based on the combined weight of water and any other solvents in the phase (that is, excluding the weight of any dissolved solids).

Apparent Viscosity of a Fluid

Viscosity is a measure of the resistance of a fluid to flow. In everyday terms, viscosity is "thickness" or "internal friction." Therefore, pure water is "thin," having a relatively low viscosity whereas honey is "thick," having a relatively higher viscosity. Put simply, the less viscous the fluid is, the greater its ease of movement (fluidity). More precisely, viscosity is defined as the ratio of shear stress to shear rate.

Most fluids are non-Newtonian fluids. Accordingly, the apparent viscosity of a fluid applies only under a particular set of conditions including shear stress versus shear rate, which must be specified or understood from the context. As used herein, a reference to viscosity is actually a reference to an apparent viscosity. Apparent viscosity is commonly expressed in units of mPa·s or centipoise (cP), which are equivalent.

Gels and Deformation

Technically, a "gel" is a semi-solid, jelly-like physical state or phase that can have properties ranging from soft and weak to hard and tough. Shearing stresses below a certain finite value fail to produce permanent deformation. The minimum shear stress which will produce permanent deformation is referred to as the shear strength or gel strength of the gel.

The physical state of a gel is formed by a network of interconnected molecules, such as a crosslinked polymer or a network of micelles in a continuous liquid phase. The network gives a gel phase its structure and an apparent yield point. At the molecular level, a gel is a dispersion in which both the network of molecules is continuous and the liquid is continuous. A gel is sometimes considered as a single phase.

In the oil and gas industry, however, the term "gel" may be used to refer to any fluid having a viscosity-increasing agent, regardless of whether it is a viscous fluid or meets the technical definition for the physical state of a gel. A "base gel" is a term used in the field for a fluid that includes a viscosity-increasing agent, such as guar or other polymer, but that excludes crosslinking agents. Typically, a base gel is mixed with another fluid containing a crosslinker, wherein the mixture is adapted to form a crosslinked gel. Similarly, a "crosslinked gel" may refer to a substance having a viscosity-increasing agent that is crosslinked, regardless of whether it is a viscous fluid or meets the technical definition for the physical state of a gel.

As used herein, a substance referred to as a "gel" is subsumed by the concept of "fluid" if it is a pumpable fluid.

A substance is considered to be a fluid if it has an apparent viscosity less than 5,000 mPa·s (cP) (independent of any gel characteristic). For reference, the viscosity of pure water is about 1 mPa·s (cP).

General Measurement Terms

Unless otherwise specified or unless the context otherwise clearly requires, any ratio or percentage means by weight.

If there is any difference between U.S. or Imperial units, U.S. units are intended. For example, "GPT" or "gal/Mgal" means U.S. gallons per thousand U.S. gallons ansssssssssd "ppt" means pounds per thousand U.S. gallons.

Unless otherwise specified, mesh sizes are in U.S. Standard Mesh.

The micrometer (μm) may sometimes be referred to herein as a micron.

The conversion between pound per gallon (lb/gal or ppg) and kilogram per cubic meter (kg/m$^3$) is: 1 lb/gal=(0.4536 kg/lb)×(gal/0.003785 m$^3$)=120 kg/m$^3$.

The conversion between pound per thousand gallons (lb/Mgal) and kilogram per cubic meter (kg/m$^3$) is: 1 lb/Mgal= (0.4536 kg/lb)×(Mgal/3.785 m$^3$)=0.12 kg/m$^3$.

Example of Diverting a Consolidation Resin Along a Treatment Zone

Method according to the invention can be used, for example, for diverting a fluid for the placement of a consolidation resin in a treatment zone, wherein the treatment zone has portions with at least two substantially different permeabilities. The diverting system is based on using at least two different particulate sizes of one or more particulates comprising a degradable material such as polylactic acid ("PLA"), which will cause a filtercake to be built up during the placement of the different particulate sizes. Preferably, the different particulate sizes and the resin are pumped in as a single fluid, although they may be introduced separately.

The formation of such filtercakes will tend to divert the treatment fluid with the consolidating liquid resin as illustrated in FIG. 1. The fluid can include solid degradable particulates with the desired sizes with a liquid resin, such as an epoxy emulsion of a resin, and, optionally, a hardener. The sizes and size distributions of the solid degradable particulates are based on the bridging theory for the pore throats of matrix such as a subterranean formation.

Referring to FIG. 1, a treatment zone of a well may have, for example, three portions $k_1$, $k_2$, and $k_3$ along a fluid flow path from a borehole into a subterranean formation of a treatment zone, wherein the portion $k_1$ closest to the borehole is illustrated as having a highest permeability, the portion $k_3$ farthest from the borehole is illustrated as having a second highest permeability, and a portion $k_2$ intermediate in distance from the borehole has a third highest permeability. Note that the various portions of a treatment zone having different permeabilities are not necessarily in any particular sequence along the length of a fluid flow path from a borehole.

During the introducing (e.g., pumping) of a treatment fluid with three different particulate sizes and a liquid resin according to an embodiment of the disclosure into the treatment zone of a well as illustrated in FIG. 1, the treatment fluid with the resin will be preferably placed into the portion $k_1$ having the highest permeability in the treatment zone. Then, as more fluid is introduced into the treatment zone, the fluid will form a filtercake in the first portion $k_1$. This will reduce an apparent permeability of the portion $k_1$. Hence, the treatment fluid will be diverted into the portion $k_3$ of the treatment zone having the second highest permeability. Then, as more treatment fluid is introduced into the treatment zone, the fluid will form a filtercake in the portion $k_3$. This will reduce an apparent permeability of the portion $k_3$. Hence, the treatment fluid will then be diverted into the portion $k_2$ of the treatment zone having the third highest permeability.

It should be understood, of course, that such a process is not strictly linear, but some filtercake buildup in the different portions may occur simultaneously but at different rates, for example, based on different bridging sizes and sequential bridging processes.

With this process, a relatively comparable placement of resin can be placed into various portions of a treatment zone having different permeabilities. During the step of introducing the treatment fluid, a gradual increase treatment pressure may be observed as filtercake builds up in the various portions.

During a step of shutting in the treatment zone, with time at the BHST, the formation of the treatment zone should be consolidated upon curing of the resin and the filtercake will be removed through degradation of the degradable particulate.

In other embodiments, the particulates comprising degradable material can be pumped separately as a slurry to build filtercake in the various portions of a treatment zone to equalize the apparent formation permeability, followed by pumping the resin into the filtercake modified zones of interest. In this case, an instant surface treatment pressure increase might be observed.

Examples of Solid Degradable Materials

As used herein, a degradable material is capable of undergoing an irreversible degradation downhole. The term "irreversible" as used herein means that the degradable material once degraded should not recrystallize or reconsolidate while downhole in the treatment zone, that is, the degradable material should degrade in situ but should not recrystallize or reconsolidate in situ.

The terms "degradable" or "degradation" refer to both the two relatively extreme cases of degradation that the degradable material may undergo, that is, heterogeneous (or bulk erosion) and homogeneous (or surface erosion), and any stage of degradation in between these two.

Preferably, the degradable material degrades slowly over time as opposed to instantaneously.

The degradable material is preferably "self-degrading." As referred to herein, the term "self-degrading" means bridging may be removed without the need to circulate a separate "clean up" solution or "breaker" into the treatment zone, wherein such clean up solution or breaker having no purpose other than to degrade the bridging in the proppant pack. Though "self-degrading," an operator may nevertheless elect to circulate a separate clean up solution through the well bore and into the treatment zone under certain circumstances, such as when the operator desires to hasten the rate of degradation. In certain embodiments, a degradable material is sufficiently acid-degradable as to be removed by such treatment.

The degradation can be a result of, inter alia, a chemical or thermal reaction or a reaction induced by radiation. The degradable material is preferably selected to degrade by at least one mechanism selected from the group consisting of: hydrolysis, hydration followed by dissolution, dissolution, decomposition, or sublimation.

The choice of degradable material can depend, at least in part, on the conditions of the well, for example, wellbore temperature. For instance, lactides can be suitable for lower temperature wells, including those within the range of about 60° F. to about 150° F., and polylactides can be suitable for well bore temperatures above this range. Dehydrated salts may also be suitable for higher temperature wells.

Selection of Degradable Particulate

In general, selection of a degradable material for a particulate depends on a number of factors including, without limitation: (1) the degradability of the material; (2) the particulate size with the degradable material; (3) the pH of the one or more treatment fluids, if water-based; (4) the design temperature; and (5) the loading of the particulates in the one or more treatment fluids.

In choosing the appropriate degradable material, the degradation products that will result should also be considered. For example, the degradation products should not adversely affect other operations or components in the well. As an example of this consideration, a boric acid derivative is preferably not included as a degradable material in the fracturing fluids where such fluids utilize xanthan as the viscosifier because boric acid and xanthan are generally incompatible. One of ordinary skill in the art, with the benefit of this disclosure, will be able to recognize when potential components of the fracturing fluids would be incompatible or would produce degradation products that would adversely affect other operations or components.

It is to be understood that a degradable material can include mixtures of two or more different degradable compounds.

Degradable Polymers

As for degradable polymers, a polymer is considered to be "degradable" herein if the degradation is due to, inter alia, chemical or radical process such as hydrolysis, oxidation, enzymatic degradation, or UV radiation. The degradability of a polymer depends at least in part on its backbone structure. For instance, the presence of hydrolyzable or oxidizable linkages in the backbone often yields a material that will degrade as described herein. The rates at which such polymers degrade are dependent on the type of repetitive unit, composition, sequence, length, molecular geometry, molecular weight, morphology (for example, crystallinity, size of spherulites, and orientation), hydrophilicity, hydrophobicity, surface area, and additives. Also, the environment to which the polymer is subjected may affect how the polymer degrades, for example, temperature, presence of moisture, oxygen, microorganisms, enzymes, pH, and the like.

Some examples of degradable polymers are disclosed in U.S. Patent Publication No. 2010/0267591, having for named inventors Bradley L. Todd and Trinidad Munoz, which is incorporated herein by reference.

Additional examples of degradable polymers include but are not limited to those described in the publication of Advances in Polymer Science, Vol. 157 entitled "Degradable Aliphatic Polyesters" edited by A.-C. Albertsson and the publication "Biopolymers" Vols. 1-10, especially Vol. 3b, Polyester II: Properties and Chemical Synthesis and Vol. 4, Polyester III: Application and Commercial Products edited by Alexander Steinbuchel, Wiley-VCH.

Non-limiting examples of degradable materials include, but are not limited to aromatic polyesters and aliphatic polyesters. Such polyesters may be linear, graft, branched, crosslinked, block, dendritic, homopolymers, random, block, and star- and hyper-branched aliphatic polyesters, etc.

Some suitable polymers include poly(hydroxy alkanoate) (PHA); poly(alpha-hydroxy) acids such as polylactic acid (PLA), polygylcolic acid (PGA), polylactide, and polyglycolide; poly(beta-hydroxy alkanoates) such as poly(beta-hydroxy butyrate) (PHB) and poly(beta-hydroxybutyrates-co-beta-hydroxyvelerate) (PI-IBV); poly(omega-hydroxy alkanoates) such as poly(beta-propiolactone) (PPL) and poly(ε-caprolactone) (PCL); poly(alkylene dicarboxylates) such as poly(ethylene succinate) (PES), polybutylene succinate) (PBS); and poly(butylene succinate-co-butylene adipate); polyanhydrides such as poly(adipic anhydride); poly(orthoesters); polycarbonates such as poly(trimethylene carbonate); and poly(dioxepan-2-one)]; aliphatic polyesters; poly(lactides); poly(glycolides); poly(E-caprolactones); poly(hydroxybutyrates); poly(anhydrides); aliphatic polycarbonates; poly(orthoesters); poly(amino acids); poly(ethylene oxides); and polyphosphazenes. Of these suitable polymers, aliphatic polyesters and polyanhydrides are preferred. Derivatives of the above materials may also be suitable, in particular, derivatives that have added functional groups that may help control degradation rates.

Aliphatic polyesters degrade chemically, inter alia, by hydrolytic cleavage. Hydrolysis can be catalyzed by acids, bases, enzymes, or metal salt catalyst solutions. Generally, during the hydrolysis, carboxylic end groups are formed during chain scission, and this may enhance the rate of further hydrolysis. This mechanism is known in the art as "autocatalysis," and is thought to make polyester matrices more bulk eroding. Suitable aliphatic polyesters have the general formula of repeating units shown below:

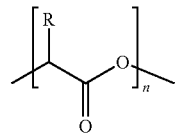

Formula I where n is an integer above 75 and more preferably between 75 and 10,000 and R is selected from the group consisting of hydrogen, alkyl, aryl, alkylaryl, acetyl, heteroatoms, and mixtures thereof.

Of the suitable aliphatic polyesters, poly(lactide) is preferred. Poly(lactide) is synthesized either from lactic acid by a condensation reaction or more commonly by ring-opening polymerization of cyclic lactide monomer. Since both lactic acid and lactide can achieve the same repeating unit, the general term poly(lactic acid) as used herein refers to formula I without any limitation as to how the polymer was made such as from lactides, lactic acid, or oligomers, and without reference to the degree of polymerization or level of plasticization.

The lactide monomer exists generally in three different forms: two stereoisomers L- and D-lactide and racemic D,L-lactide (meso-lactide). The oligomers of lactic acid and oligomers of lactide are defined by the formula:

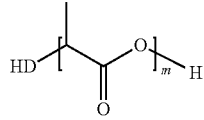

Formula II where m is an integer 2≤m≤75. Preferably m is an integer and 2≤m≤10. These limits correspond to number average molecular weights below about 5,400 and below about 720, respectively. The chirality of the lactide units provides a means to adjust, inter alia, degradation rates, as well as physical and mechanical properties. Poly(L-lactide), for instance, is a semicrystalline polymer with a relatively slow hydrolysis rate. This could be desirable in applications where a slower degradation of the degradable material is desired. Poly(D,L- lactide) may be a more amorphous polymer with a resultant faster hydrolysis rate. This may be suitable for other applications where a more rapid degradation may be appropriate. The stereoisomers of lactic acid may be used individually or combined. Additionally, they may be copolymerized with, for example, glycolide or other monomers like E-caprolactone, 1,5-dioxepan-2-one, trimethylene carbonate, or other suitable monomers to obtain polymers with different properties or degradation times. Additionally, the lactic acid stereoisomers can be modified to be used by, among other things, blending, copolymerizing or otherwise mixing the stereoisomers, blending, copolymerizing or otherwise mixing high and low molecular weight polylactides, or by blending, copolymerizing or otherwise mixing a polylactide with another polyester or polyesters. See U.S. application Publication Nos. 2005/0205265 and 2006/0065397, incorporated herein by reference. One skilled in the art would recognize the utility of oligomers of other organic acids that are polyesters.

Polycondensation reactions, ring-opening polymerizations, free radical polymerizations, anionic polymerizations, carbocationic polymerizations, coordinative ring-opening polymerization, and any other suitable process may prepare such suitable polymers.

Degradable Anionic Compounds that Can Bind a Multi-Valent Metal

Certain anionic compounds that can bind a multi-valent metal are degradable. More preferably, the anionic compound is capable of binding with any one of the following: Calcium, magnesium, iron, lead, barium, strontium, titanium, zinc, or zirconium. One skilled in the art would recognize that proper conditions (such as pH) may be required for this to take place.

Examples of anionic compounds that can bind with a multi-valent metal include scale inhibiting chemicals and chelating chemicals. Examples of suitable scale-inhibiting and chelating chemicals are disclosed in U.S. Patent App. Pub. No. 2011/0028358filed on Jul. 30, 2009, entitled "Methods of Fluid Loss Control and Fluid Diversion in Subterranean Formations," incorporated herein by reference.

In general, degradable scale inhibitors include, but are not limited to, bis(hexamethylene triamine penta (methylene phosphonic acid)); diethylene triamine penta (methylene phosphonic acid); ethylene diamine tetra (methylene phosphonic acid); hexamethylenediamine tetra(methylene phosphonic acid); 1-hydroxy ethylidene-1,1-diphosphonic acid; 2-hydroxyphosphonocarboxylic acid; 2-phosphonobutane-1, 2,4-tricarboxylic acid; phosphino carboxylic acid; diglycol amine phosphonate; aminotris(methanephosphonic acid); methylene phosphonates; phosphonic acids; aminoalkylene phosphonic acids; aminoalkyl phosphonic acids; polyphosphates, salts thereof (such as but not limited to: sodium, potassium, calcium, magnesium, ammonium); and combinations thereof. As an added benefit, these types of particulate have scale-inhibiting properties, wherein the particulate releases the scale inhibitor over time.

In general, degradable chelating agents may be any suitable chelating agent in particulate form that is insoluble in the fluid in which it is carried. For example, for use in a water-based fluid, the degradable chelating agent should be insoluble in water. Suitable chelating agents that are insoluble in water generally include, but are not limited to, the acidic forms of the following: ethylenediaminetetraacetic acid (EDTA), hydroxyethyl ethylenediamine triacetic acid (HEDTA), nitrilotriacetic acid (NTA), diethylene triamine pentaacetic acid (DTPA), glutamic acid diacetic acid (GLDA), glucoheptonic acid (CSA), propylene diamine tetraacetic acid (PDTA), ethylenediaminedisuccinic acid (EDDS), diethanolglycine (DEG), ethanoldiglycine (EDG), glucoheptonate, citric acid, malic acid, phosphates, amines, citrates, derivatives thereof, and combinations thereof. Other suitable chelating agents may include the acidic forms of chelating agents classified as polyphosphates (such as sodium tripolyphosphate and hexametaposphoric acid), aminocarboxylic acids (such as N-dihydroxyethylglycine), aminopolycarboxylates, 1,3-diketones (such as acetylacetone, trifluoroacetylacetone, and thenoyltrifluoroacetone), hydroxycarboxylic acids (such as tartaric acid, gluconic acid and 5-sulfosalicylic acid), polyamines (such as ethylenediamine, dethylentriamine, treithylenetetramine, and triaminotriethylamine), aminoalcohols (such as triethanolamine, N-hydroxyethylethylenediamine), aromatic heterocyclic bases (such as dipyridyl and o-phenanthroline), phenols (such as salicylaldehyde, disulfopyrocatechol, and chromotropic acid), aminophenols (such as oxine and 8-hydroxyquinoline), oximes (such as oxinesulfonic acid, dimethylglyoxime, and salicylaldoxime), Schiff bases (such as disaliclaldehyde 1,2-propylenediimine), tetrapyrroles (such as tetraphenylporphine and phthalocyanine), sulfur compounds (such as toluenedithiol, dimercaptopropanol, thioglycolic acid, potassium ethyl xanthate, sodium diethyldithiocarbamate, dithizone, diethyl dithiophosphoric acid, and thiourea), synthetic macrocyclic compounds (such as dibenzo-[18]-crown-6, and hexamthyl-[14]-4,11 dieneN4 (2.2.2-cryptate), polymers (such as polyethoeneimines, polymethacryloylacetone, poly(p-vinylbenzyliminodiacetic acid), phosphonic acids (such as nitrilotrimethylenephosphonic acid, ethylenediaminetetra(methylenephosphonic acid) and hydroxyehtylidenediphosphonic acid), derivatives thereof, and combinations thereof.

In general, a degradable scale inhibitor or a degradable chelating agent is insoluble in water, but is substantially soluble when contacted with a solubilizing agent. Therefore, in certain embodiments, a solubilizing agent can be introduced into the well bore (or may be already present in the subterranean formation), whereby the degradable material is dissolved. In some embodiments, the solubilizing agent may have the effect of causing the degradable material to form its free acid, to dissolve, to hydrolyze into solution, to form its salt, to change salts, etc., and thereby become soluble.

Suitable solubilizing agents include salts, including ammonium salts, or aqueous fluids containing a salt or having a different pH than the fracturing fluid, such as brine, formation fluids (for example, produced formation water, returned load water, etc.), acidic fluids, and spent acid. The type of solubilizing agent used generally depends upon the type of degradable material to be solubilized. For example, solubilizing agents comprising acidic fluids may be suitable for use with polymeric scale inhibitors. One of ordinary skill in the art with the benefit of this disclosure will be able to select an appropriate solubilizing agent based on the type of scale inhibitor or chelating agent used.

In some embodiments, the fluid can optionally comprise an acid generating compound. Examples of acid generating compounds that may be suitable include, but are not limited to, esters, aliphatic polyesters, ortho esters, which may also be known as ortho ethers, poly(ortho esters), which may also be known as poly(ortho ethers), poly(lactides), poly(glycolides), poly(c-caprolactones), poly(hydroxybutyrates), poly(anhydrides), or copolymers thereof. Derivatives and combinations also may be suitable. The term "copolymer" as used herein is not limited to the combination of two polymers, but includes any combination of polymers, for example, terpolymers. Other suitable acid-generating compounds include: esters including, but not limited to, ethylene glycol monoformate, ethylene glycol diformate, diethylene glycol diformate, glyceryl monoformate, glyceryl diformate, glyceryl triformate, triethylene glycol diformate and formate esters of pentaerythritol. Other suitable materials may be disclosed in U.S. Pat. Nos. 6,877,563 and 7,021,383, the disclosures of which are incorporated by reference.

In some applications, a degradable material comprising a scale inhibitor or a chelating agent may be at least partially coated or encapsulated with slowly water soluble or other similar encapsulating materials. Such materials are well known to those skilled in the art. Examples of water-soluble and other similar encapsulating materials that can be utilized include, but are not limited to, porous solid materials such as precipitated silica, elastomers, polyvinylidene chloride (PVDC), nylon, waxes, polyurethanes, cross-linked partially hydrolyzed acrylics, and the like.

Degradable anionic compounds that can bind a multi-valent metal advantage over other potential chemistries are their ability to provide a secondary function such as scale or iron control. This may also provide an economical advantage.

Solid Materials that Degrade by Sublimation

Suitable examples of degradable materials that can be used include but are not limited to those that sublime under the design temperature or finally under the bottom hole static temperature ("BHST") of the treatment zone.

An example of a suitable solid is a solid azo organic compound having an azo component and a methylenic component and is characterized by having a melting point of at least 332.6° F., a degree of solubility in water at a temperature of from about 200° F. to about 425° F. and a pressure of 600 pounds per square inch (p.s.i.) of less than about 20 pounds of the compound in 1,000 gallons of water, a degree of solubility in kerosene at a temperature of from about 200° F. to about 425° F. and a pressure of 600 p.s.i. of at least 2 pounds of the compound in 1,000 gallons of kerosene, and a sublimation rate at a temperature of from about 250° F. to about 425° F. of from about 1 percent by weight of the compound in 24 hours to about 100 percent by weight of the compound in 12 hours.

Examples of suitable solid azo compounds having an azo component and a methylenic component such as the compounds known as Hansa Yellow G and Fast Yellow 4RLF. Hansa Yellow G can be made by coupling orthonitroparatoluidine and acetoacetanilid. Methods of its preparation are well known and are disclosed in U.S. Pat. No. 2,410,219. Fast Yellow 4RLF dye's preparation is well known and is disclosed in U.S. Pat. No. 2,410,219. Additional disclosure is provided in U.S. Pat. No. 4,527,628. U.S. Pat. Nos. 2,410,219 and 4,527,628 are incorporated by reference.

Solid materials that degrade by sublimation have a technical advantage in that no aqueous phase is needed for their degradation.

Degradable Dehydrated Compounds

A dehydrated compound may be used as a degradable material. As used herein, a dehydrated compound means a compound that is anhydrous or of a lower hydration state, but chemically reacts with water to form one or more hydrated states where the hydrated state is more soluble than the dehydrated or lower hydrated state.

A dehydrated compound is suitable if it will degrade over time as it is hydrated. For example, a solid anhydrous borate material that degrades over time can be suitable. Specific examples of solid anhydrous borate materials that may be used include but are not limited to anhydrous sodium tetraborate (also known as anhydrous borax), and anhydrous boric acid. These anhydrous borate materials are only slightly soluble in water. However, with time and heat in a subterranean environment, the anhydrous borate materials react with the surrounding aqueous fluid and are hydrated. The resulting hydrated borate materials are substantially soluble in water as compared to anhydrous borate materials and as a result degrade in the aqueous fluid. In some instances, the total time required for the anhydrous borate materials to degrade in an aqueous fluid is in the range of from about 8 hours to about 72 hours depending upon the temperature of the treatment zone in which they are placed.

Examples of suitable boron compounds are disclosed in U.S. Pat. No. 8,657,003, filed Dec. 1, 2010 having for named inventors Thomas D. Welton and Bradley L. Todd entitled "Methods of Providing Fluid Loss Control or Diversion," which is incorporated herein by reference in the entirety. A relatively insoluble borate material ("RIBM") degrades or dissolves in the presence of an aqueous fluid in contact therewith and, once removed, the free movement of fluids within the formation is again allowed.

The RIBM's include, but are not limited to, solid, slowly soluble borate materials such as anhydrous sodium tetraborate (also known as anhydrous borax), sodium tetraborate monohydrate, and anhydrous boric acid (also known as boric oxide). Without being limited by theory, it is believed that these borate materials are only slightly soluble in water; however, with time and heat in the subterranean zone, the borate materials react with the surrounding aqueous fluid and are hydrated. The resulting hydrated borate materials are highly soluble in water as compared to the anhydrous borate materials and as a result can be dissolved in an aqueous fluid. The total time required for the anhydrous borate materials to degrade and dissolve in an aqueous fluid is in the range of from about eight hours to about seventy-two hours depending upon the temperature of the subterranean zone in which they are placed. One skilled in the art would recognize that some hydrates, such as sodium tetraborate monohydrate, are relatively insoluble compared to their counterparts that are hydrated to a greater degree.

The RIBM degrades over time when in contact with an aqueous fluid and converts to the hydrated form of borate material. The treatment fluid itself may be aqueous, or the RIBM may come into contact with water after it is placed into the subterranean formation. The RIBM dissolves in an aqueous fluid, thereby eliminating the need for contacting the subterranean zone with clean-up fluids to remove the material and restore permeability. Another advantage of the relatively insoluble borate material materials is that the melting points of the materials are high, i.e., 1367° F. for anhydrous sodium tetraborate and 840° F. for anhydrous boric oxide, and as a result, the materials do not readily soften and are suitable for use in high temperature subterranean zones.

Selection of an RIBM and treatment fluid for a desired use depends on a number of factors including (1) the solubility of the chosen RIBM, (2) the particle size of the RIBM, (3) the pH of the treatment fluid, (4) the design temperature, and (5) the loading of RIBM in the treatment fluid.

The solubility of the RIBM can be affected by the pH of the treatment fluid, by the design temperature, and by the selection of the RIBM itself. By way of example, for pH levels of between about 8 and 12, higher pH increases solubility of an anhydrous boric acid RIBM to whereas decreasing the pH increases the solubility of an anhydrous borax RIBM. The solubility of the RIBM can be controlled such that complete dissolution of the RIBM at design temperature takes more than two hours, and in some cases longer than a week. In still other preferred embodiments, the solubility of the RIBM can be controlled such that 50% dissolution of the RIBM at design temperature takes at least two hours. In still other preferred embodiments, the solubility of the RIBM is controlled such that 50% dissolution of the RIBM at design temperature takes at least twenty-four hours.

To allow for relatively slow solubility, the treatment fluids in which this is used are preferably pH neutral or below, at least initially.

Degradable dehydrated compounds have several advantageous properties. First, they have minimal impact on the pH. Second, some also swell and this may provide additional control of fluid flow. Finally, they typically degrade faster than degradable polymers.

Common Well Treatments and Treatment Fluids

Well services can include various types of treatments that are commonly performed in a wellbore or subterranean formation. For example, stimulation is a type of treatment performed to enhance or restore the productivity of oil or gas from a well. Even small improvements in fluid flow can yield dramatic production results.

Stimulation treatments fall into two main groups: hydraulic fracturing and matrix treatments. Fracturing treatments are performed above the fracture pressure of the subterranean formation to create or extend a highly permeable flow path between the formation and the wellbore. Matrix treatments are performed below the fracture pressure of the formation. Fracturing treatments are often applied in treatment zones having poor natural permeability. Matrix treatments are often applied in treatment zones having good natural permeability to counteract damage in the near-wellbore area.

Other types of completion or intervention treatments can include, for example, gravel packing, consolidation, and controlling excessive water production.

Hydraulic Fracturing

The purpose of a hydraulic fracturing treatment is to provide an improved flow path for oil or gas to flow from a hydrocarbon-bearing formation to the wellbore. In addition, a fracturing treatment can facilitate the flow of injected treatment fluids from the well into the formation. A treatment fluid adapted for this purpose is sometimes referred to as a fracturing fluid. The fracturing fluid is pumped at a sufficiently high flow rate and pressure into the wellbore and into the subterranean formation to create or enhance one or more fractures in the subterranean formation. Creating a fracture means making a new fracture in the formation. Enhancing a fracture means enlarging a pre-existing fracture in the formation.

A frac pump is used for hydraulic fracturing. A frac pump is a high-pressure, high-volume pump. The fracturing fluid may be pumped down into the wellbore at high rates and pressures, for example, at a flow rate in excess of 50 barrels per minute (2,100 U.S. gallons per minute) at a pressure in excess of 5,000 pounds per square inch ("psi"). The pump rate and pressure of the fracturing fluid may be even higher, for example, flow rates in excess of 100 barrels per minute and pressures in excess of 10,000 psi are often encountered.

A high volume of fracturing fluids is often used in fracturing of a well, which means that a low-cost fracturing fluid is desirable. Because of the ready availability and relative low cost of water compared to other liquids, among other considerations, a fracturing fluid is usually water-based.

A newly-created or newly-extended fracture will tend to close together after the pumping of the fracturing fluid is stopped. To prevent the fracture from closing, a material is usually placed in the fracture to keep the fracture propped open and to provide higher fluid conductivity than the matrix of the formation. A material used for this purpose is referred to as a proppant.

A proppant is in the form of a solid particulate, which can be suspended in the fracturing fluid, carried downhole, and deposited in the fracture to form a proppant pack. The proppant pack props the fracture in an open condition while allowing fluid flow through the permeability of the pack. The proppant pack in the fracture provides a higher-permeability flow path for the oil or gas to reach the wellbore compared to the permeability of the matrix of the surrounding subterranean formation. This higher-permeability flow path increases oil and gas production from the subterranean formation.

A particulate for use as a proppant is usually selected based on the characteristics of size range, crush strength, and solid stability in the types of fluids that are encountered or used in wells. Preferably, a proppant should not melt, dissolve, or otherwise degrade from the solid state under the downhole conditions.

Suitable proppant materials include, but are not limited to, silica sand, ground nut shells, ground fruit pits, sintered bauxite, glass, plastics, ceramic materials, processed wood, composite materials, resin coated particulates, and any combination of the foregoing. Mixtures of different kinds or sizes of proppant can be used as well.

In conventional reservoirs, a proppant commonly has a median size anywhere within the range of about 20 to about 100 U.S. Standard Mesh. For a synthetic proppant, it commonly has a median size anywhere within the range of about 8 to about 100 U.S. Standard Mesh.

The concentration of proppant in the treatment fluid depends on the nature of the subterranean formation. As the nature of subterranean formations differs widely, the concentration of proppant in the treatment fluid may be in the range of from about 0.03 kilograms to about 12 kilograms of proppant per liter of liquid phase (from about 0.1 lb/gal to about 25 lb/gal).

Sand Control and Gravel Packing

Gravel packing is commonly used as a sand-control method to prevent production of formation sand or other fines from a poorly consolidated subterranean formation. In this context, "fines" are tiny particles, typically having a diameter of 43 microns or smaller, that have a tendency to flow through the formation with the production of hydrocarbon. The fines have a tendency to plug small pore spaces in the formation and block the flow of oil. As all the hydrocarbon is flowing from a relatively large region around the wellbore toward a relatively small area around the wellbore, the fines have a tendency to become densely packed and screen out or plug the area immediately around the wellbore. Moreover, the fines are highly abrasive and can be damaging to pumping and oilfield other equipment and operations.

Placing a relatively larger particulate near the wellbore helps filter out the sand or fine particles and prevents them from flowing into the well with the produced fluids. The primary objective is to stabilize the formation while causing minimal impairment to well productivity.

The particulate used for this purpose is referred to as "gravel." In the oil and gas field, and as used herein, the term "gravel" is refers to relatively large particles in the sand size classification, that is, particles ranging in diameter from about 0.1 mm up to about 2 mm. Generally, a particulate having the properties, including chemical stability, of a low-strength proppant is used in gravel packing. An example of a commonly used gravel packing material is sand having an appropriate particulate size range.

In one common type of gravel packing, a mechanical screen is placed in the wellbore and the surrounding annulus is packed with a particulate of a larger specific size designed to prevent the passage of formation sand or other fines. The screen holds back gravel during flow back.

In some gravel packing applications, a resinous material can be coated on the particulate. The term "coated" does not imply any particular degree of coverage on the particulates, which coverage can be partial or complete.

Carrier Fluid for Particulate

Increasing Viscosity of Fluid for Suspending Particulate

Increasing the viscosity of a fluid can help prevent a particulate having a different specific gravity than a surrounding phase of the fluid from quickly separating out of the fluid.

A viscosity-increasing agent can be used to increase the ability of a fluid to suspend and carry a particulate material in a fluid. A viscosity-increasing agent can be used for other purposes, such as matrix diversion, conformance control, or friction reduction.

A viscosity-increasing agent is sometimes referred to in the art as a viscosifying agent, viscosifier, thickener, gelling agent, or suspending agent. In general, any of these refers to an agent that includes at least the characteristic of increasing the viscosity of a fluid in which it is dispersed or dissolved. There are several kinds of viscosity-increasing agents or techniques for increasing the viscosity of a fluid.

In general, because of the high volume of fracturing fluid typically used in a fracturing operation, it is desirable to efficiently increase the viscosity of fracturing fluids to the desired viscosity using as little viscosity-increasing agent as possible. In addition, relatively inexpensive materials are preferred. Being able to use only a small concentration of the viscosity-increasing agent requires a lesser concentration of the viscosity-increasing agent in order to achieve the desired fluid viscosity.

Polymers for Increasing Viscosity

Certain kinds of polymers can be used to increase the viscosity of a fluid. In general, the purpose of using a polymer is to increase the ability of the fluid to suspend and carry a particulate material. Polymers for increasing the viscosity of a fluid are preferably soluble in the external phase of a fluid. Polymers for increasing the viscosity of a fluid can be naturally occurring polymers such as polysaccharides, derivatives of naturally occurring polymers, or synthetic polymers.

Water-Soluble Polymers for Increasing Viscosity

Treatment fluids used in high volumes, such as fracturing fluids, are usually water-based. Efficient and inexpensive viscosity-increasing agents for water include certain classes of water-soluble polymers.

The water-soluble polymer can have, for example, an average molecular weight in the range of from about 50,000 Da to about 20,000,000 Da, most preferably from about 100,000 Da to about 4,000,000 Da.

The viscosity-increasing agent should be present in a treatment fluid in a form and in an amount at least sufficient to impart the desired viscosity to a treatment fluid. A viscosity-increasing agent may be present in the fluids in a concentration in the range of from about 0.01% to about 5% by weight of the continuous phase therein.

Crosslinking of Polymer to Increase Viscosity of a Fluid or Form a Gel

The viscosity of a fluid at a given concentration of viscosity-increasing agent can be greatly increased by crosslinking the viscosity-increasing agent. A crosslinking agent, sometimes referred to as a crosslinker, can be used for this purpose. A crosslinker interacts with at least two polymer molecules to form a "crosslink" between them.

If crosslinked to a sufficient extent, the polysaccharide may form a gel with water. Gel formation is based on a number of factors including the particular polymer and concentration thereof, the particular crosslinker and concentration thereof, the degree of crosslinking, temperature, and a variety of other factors known to those of ordinary skill in the art.

The degree of crosslinking depends on the type of viscosity-increasing polymer used, the type of crosslinker, concentrations, temperature of the fluid, etc. Shear is usually required to mix the base gel and the crosslinking agent. Therefore, the actual number of crosslinks that are possible and that actually form also depends on the shear level of the system. The number of crosslinks is believed to significantly alter fluid viscosity.

For a polymeric viscosity-increasing agent, any crosslinking agent that is suitable for crosslinking the chosen monomers or polymers may be used.

Cross-linking agents typically comprise at least one metal ion that is capable of cross-linking the viscosity-increasing agent molecules.

Some crosslinking agents form substantially permanent crosslinks with viscosity-increasing polymer molecules. Such crosslinking agents include, for example, crosslinking agents of at least one metal ion that is capable of crosslinking gelling agent polymer molecules. Examples of such crosslinking agents include, but are not limited to, zirconium compounds (such as, for example, zirconium lactate, zirconium lactate triethanolamine, zirconium carbonate, zirconium acetylacetonate, zirconium maleate, zirconium citrate, zirconium oxychloride, and zirconium diisopropylamine lactate); titanium compounds (such as, for example, titanium lactate, titanium maleate, titanium citrate, titanium ammonium lactate, titanium triethanolamine, and titanium acetylacetonate); aluminum compounds (such as, for example, aluminum acetate, aluminum lactate, or aluminum citrate); antimony compounds; chromium compounds; iron compounds (such as, for example, iron chloride); copper compounds; zinc compounds; sodium aluminate; or a combination thereof.

Preferably, the source of a polyvalent metal cation is derived from a water-soluble salt of the polyvalent metal in which the metal is in the same cationic valence state as the crosslinking species. By this, it is intended to mean that the metal ion which forms the crosslinking need not be freshly formed as by a change in the valence state of the metal ion.

Where present, the cross-linking agent generally should be included in the fluids in an amount sufficient, among other things, to provide the desired degree of cross linking. In some embodiments, the cross-linking agent may be present in the treatment fluids in an amount in the range of from about 0.01% to about 5% by weight of the treatment fluid.

Buffering compounds may be used if desired, for example, to delay or control the cross linking reaction. These may include glycolic acid, carbonates, bicarbonates, acetates, phosphates, and any other suitable buffering agent.

Sometimes, however, crosslinking is undesirable, as it may cause the polymeric material to be more difficult to break and it may leave an undesirable residue in the formation.

Breaking Viscosity of a Fluid or Filtercake

After a treatment fluid is placed where desired in the well and for the desired time, the downhole fluid or filtercake formed by the fluid usually must then be removed from the wellbore or the formation.

For example, in the case of hydraulic fracturing, the fluid should be removed leaving the proppant in the fracture and without damaging the conductivity of the proppant bed. To accomplish this removal, the viscosity of the treatment fluid must be reduced to a very low viscosity, preferably near the viscosity of water, for optimal removal from the propped fracture. Similarly, when a viscosified fluid is used for gravel packing, the viscosified fluid must be removed from the gravel pack.

Reducing the viscosity of a viscosified treatment fluid is referred to as "breaking" the fluid. Removing a filtercake can be referred to as breaking a filtercake. Chemicals for these purposes are called breakers. No particular mechanism is necessarily implied by breaking.

For example, for use a fluid viscosified with a polymeric material as the viscosity-increasing agent, a breaker can operate by cleaving the polymeric linkages of a polymer by hydrolysis of acetyl group, cleavage of glycosidic bonds, oxidative/reductive cleavage, free radical breakage, or a combination of these processes. Accordingly, such a breaker can reduce the molecular weight of the polymer by cutting the long polymer chain. As the length of the polymer chain is cut, the viscosity of the fluid is reduced.

In another example, a breaker may reverse a crosslinking of a viscosity-increasing agent or attack the crosslinker.

Chemical Breakers

Chemical breakers used to help clean up a filtercake or break the viscosity of a viscosified fluid are generally grouped into several classes: oxidizers, enzymes, chelating agents, and acids.

Oxidizers commonly used to reduce viscosity of natural polymers includes, for example, sodium persulfate, potassium persulfate, ammonium persulfate, lithium or sodium hypochlorites, chlorites, peroxide sources (sodium perborate, sodium percarbonate, calcium percarbonate, urea-hydrogen peroxide, hydrogen peroxide, etc.), bromates, periodates, permanganates, etc. In these types of breakers, oxidation reduction chemical reactions occur as the polymer chain is broken.

Different oxidizers are selected based on their performance at different temperature and pH ranges. Consideration is also given to the rate of oxidation at a particular temperature and pH range.

Enzymes are also used to break the natural polymers in oil field applications. They are generally used at low temperature 25° C. (77° F.) to 70° C. (158° F.) as at higher temperature they denature and become ineffective. At very low temperatures, enzymes are not as effective as the rate of breakage of polymer is very slow and they are generally not recommended. Different types of enzymes are used to break different types of bond in the polysaccharides. Some enzymes break only α-glycosidic linkage and some break β-glycosidic linkage in polysaccharides. Some enzymes break polymers by hydrolysis and some by oxidative pathways. A specific enzyme is needed to break a specific polymer/polysaccharide. Enzymes are referred to as Nature's catalysts because most biological processes involve an enzyme. Enzymes are large protein molecules, and proteins consist of a chain of building blocks called amino acids. The simplest enzymes may contain fewer than 150 amino acids while typical enzymes have 400 to 500 amino acids.

Acids also provide a break via hydrolysis. Acids, however, pose various difficulties for practical applications. Acids are not used as a polysaccharide polymer breaker very often because of cost, poor break rate control, chemical compatibility difficulties, and corrosion of metal goods.

A breaker may be included in a treatment fluid in a form and concentration at selected to achieve the desired viscosity reduction at a desired time.

The breaker may be formulated to provide a delayed break, if desired. For example, a suitable breaker may be encapsulated if desired. Suitable encapsulation methods are known to those skilled in the art. One suitable encapsulation method involves coating the selected breaker in a porous material that allows for release of the breaker at a controlled rate. Another suitable encapsulation method that may be used involves coating the chosen breakers with a material that will degrade when downhole so as to release the breaker when desired. Resins that may be suitable include, but are not limited to, polymeric materials that will degrade when downhole.

A treatment fluid can optionally include an activator or a retarder to, among other things, optimize the break rate provided by a breaker. Examples of such activators include, but are not limited to, acid generating materials, chelated iron, copper, cobalt, and reducing sugars. Examples of retarders include sodium thiosulfate, methanol, and diethylenetriamine.

Delayed breakers, activators, and retarders can be used to help control the breaking of a fluid or filtercake, but these may add additional complexity and cost to the design of a treatment fluid.

Other Fluid Additives

A treatment fluid can contain additives that are commonly used in oil field applications, as known to those skilled in the art. These include, but are not necessarily limited to, inorganic water-soluble salts, salt substitutes (such as trimethyl or tetramethyl ammonium chloride), pH adjusters, defoamers, breaker aids, oxygen scavengers, alcohols, corrosion inhibitors, hydrate inhibitors, fluid-loss control additives, oxidizers, water-control agents (such as relative permeability modifiers), conductivity enhancing agents, clay stabilizers, sulfide scavengers, fibers, nanoparticles, bactericides, and combinations thereof. Of course, additives should be selected for not interfering with the purpose of the fluid.

Treating a Well with a Treatment Fluid

A method according to the disclosure includes: forming one or more treatment fluids according to any of the various embodiments of the disclosure; and introducing the one or more treatment fluids into the well.

A treatment fluid can be prepared at the job site, prepared at a plant or facility prior to use, or certain components of the fluid can, be pre-mixed prior to use and then transported to the job site. Certain components of the fluid may be provided as a "dry mix" to be combined with fluid or other components prior to or during introducing the fluid into the well.

In certain embodiments, the preparation of a treatment fluid can be done at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing.

Often the step of delivering a fluid into a well is within a relatively short period after forming the fluid, for example, less within 30 minutes to one hour. More preferably, the step of delivering the fluid is immediately after the step of forming the fluid, which is "on the fly."

It should be understood that the step of delivering a fluid into a well can advantageously include the use of one or more fluid pumps.

The method can include the step of, prior to introducing the treatment fluid, isolating a zone of interest in the subterranean.

In an embodiment, the step or steps of introducing one or more fluids are at a rate and pressure below the fracture pressure of the treatment zone.

After introducing the one or more treatment fluids, in an embodiment the method includes the step of allowing time for degrading the degradable material in the well. This can be accomplished, for example, by shutting in the treatment zone before flowing back fluid from the well. The degrading of the degradable material preferably occurs with time under the conditions in the zone of the subterranean fluid. In various embodiments, the degradable material is adapted to degrade at least 50% within about 30 days. More preferably, the treatment fluid is adapted to break within 5 days.

In various embodiments, a step of flowing back from the treatment zone is within about 30 days of the step or steps of introducing the particulates of degradable material. In another embodiment, the step of flowing back is within about 5 days of the step or steps of introducing.

Preferably, after any such method according to the disclosure, a step of producing hydrocarbon from the well or a particular zone is the desirable objective.

CONCLUSION

Therefore, the present disclosure is well adapted to attain the ends and advantages mentioned as well as those that are inherent therein.

The exemplary fluids disclosed herein may directly or indirectly affect one or more components or pieces of equipment associated with the preparation, delivery, recapture, recycling, reuse, or disposal of the disclosed fluids. For example, the disclosed fluids may directly or indirectly affect one or more mixers, related mixing equipment, mud pits, storage facilities or units, fluid separators, heat exchangers, sensors, gauges, pumps, compressors, and the like used generate, store, monitor, regulate, or recondition the exemplary fluids. The disclosed fluids may also directly or indirectly affect any transport or delivery equipment used to convey the fluids to a well site or downhole such as, for example, any transport vessels, conduits, pipelines, trucks, tubulars, or pipes used to fluidically move the fluids from one location to another, any pumps, compressors, or motors (for example, topside or downhole) used to drive the fluids into motion, any valves or related joints used to regulate the pressure or flow rate of the fluids, and any sensors (i.e., pressure and temperature), gauges, or combinations thereof, and the like. The disclosed fluids may also directly or indirectly affect the various downhole equipment and tools that may come into contact with the chemicals/fluids such as, but not limited to, drill string, coiled tubing, drill pipe, drill collars, mud motors, downhole motors or pumps, floats, measurement-while-drilling (MWD) / logging-while-drilling (LWD) tools and related telemetry equipment, drill bits (including roller cone, polycrystalline diamond compact (PDC), natural diamond, hole openers, reamers, and coring bits), sensors or distributed sensors, downhole heat exchangers, valves and corresponding actuation devices, tool seals, packers and other wellbore isolation devices or components, and the like.

The particular embodiments disclosed above are illustrative only, as the present disclosure may be modified and practiced in different but equivalent manners apparent to those skilled in the art having the benefit of the teachings herein. It is, therefore, evident that the particular illustrative embodiments disclosed above may be altered or modified and all such variations are considered within the scope of the present disclosure.

The various elements or steps according to the disclosed elements or steps can be combined advantageously or practiced together in various combinations or sub-combinations of elements or sequences of steps to increase the efficiency and benefits that can be obtained from the disclosure.

It will be appreciated that one or more of the above embodiments may be combined with one or more of the other embodiments, unless explicitly stated otherwise.

This illustrative disclosure can be practiced in the absence of any element or step that is not specifically disclosed or claimed.

Furthermore, no limitations are intended to the details of composition, design, or steps herein shown, other than as described in the claims.

What is claimed is:

1. A method of treating a treatment zone of a subterranean formation penetrated by a wellbore of a well, the method comprising:
    (A) introducing into the treatment zone a first particulate, wherein:
        (i) the first particulate comprises a first degradable material;
        (ii) the first particulate comprises a first particulate having a first particulate D50 size selected to bridge a plurality of pore throats of a first matrix of the treatment zone where the permeability of the first matrix is in the range of 10,000 mD to 100 mD; and
    (B) introducing into the treatment zone a second particulate, wherein:
        (i) the second particulate comprises a second degradable material;
        (ii) the second particulate comprises a second particulate having a second particulate D50 size selected to bridge a plurality of pore throats of a second matrix of the treatment zone, where the permeability of the second matrix is in the range of 5,000 mD to 50 mD subject to the second matrix permeability also being less than one-half the first matrix permeability;
        (iii) the first degradable material and the second degradable material can be the same or different; and
        (iv) the second particulate is introduced into the treatment zone simultaneously with the first particulate or separately from the first particulate but at least before the first degradable material of the first particulate degrades more than 50% by weight in the treatment zone; and
    (C) introducing into the treatment zone a liquid resin, wherein the liquid resin is introduced into the treatment zone:
        (i) simultaneously with the first particulate or separately from the first particulate but at least before the first degradable material of the first particulate degrades more than 50% by weight in the treatment zone; and
        (ii) simultaneously with the second particulate or separately from the second particulate but at least before the second degradable material of the second particulate degrades more than 50% by weight in the treatment zone.

2. The method according to claim 1, wherein: the second matrix permeability is less than one-third of the first matrix permeability.

3. The method according to claim 1, additionally comprising: introducing into the treatment zone a third particulate, wherein:
    (i) the third particulate comprises a third degradable material;
    (ii) the third particulate comprises a third particulate having a third particulate D50 size selected to bridge a plurality of pore throats of a third matrix of the treatment zone, where the permeability of the third matrix is in the range of 2,500 mD to 50 mD subject to the third matrix permeability also being less than one-half the second matrix permeability;

(iii) the third degradable material is the same or different than the first degradable material or the second degradable material;

(iv) the third particulate is introduced into the treatment zone simultaneously with the first particulate or separately from the first particulate but at least before the first degradable material of the first particulate degrades more than 50% by weight in the treatment zone;

(v) the third degradable material is introduced into the treatment zone simultaneously with the second particulate or separately from the second particulate but at least before the second degradable material of the second particulate degrades more than 50% by weight in the treatment zone; and (vi) the liquid resin is introduced into the treatment zone simultaneously with the third particulate or separately from the third particulate but at least before the third degradable material of the third particulate degrades more than 50% by weight in the treatment zone.

4. The method according to claim 3, wherein: the third matrix permeability is less than one-third of the second matrix permeability.

5. The method according to claim 3, wherein the first particulate D50 size, the second particulate D50 size, and the third particulate D50 size are independently selected to be within an overall size range of 100 micron to 0.1 micron.

6. The method according to claim 3, wherein:
(a) the first particulate D50 size is selected to have a D50 measured in microns that is in the range of one-third to two-thirds of the square root of the permeability of the first matrix measured in mD;
(b) the second particulate D50 size is selected to have a D50 measured in microns that is in the range of one-third to two-thirds of the square root of the permeability of the second matrix measured in mD; and
(c) the third particulate D50 size is selected to have a D50 measured in microns that is in the range of one-third to two-thirds of the square root of the permeability of the third matrix measured in mD.

7. The method according to claim 3, wherein the first, second, and third particulates independently comprise at least 50% by weight of the first, second, and third degradable materials, respectively.

8. The method according to claim 3, wherein the first, second, and third particulates independently consist essentially of the first, second, and third degradable materials, respectively.

9. The method according to claim 3, wherein the first, second, and third degradable materials are independently selected from the group consisting of:
degradable polymeric materials, degradable anionic compounds that can bind a multi-valent metal, solid materials that degrade by sublimation degradable dehydrated compounds, and any combination thereof.

10. The method according to claim 9, wherein the degradable polymeric materials are independently selected from the group consisting of: a polyester, a polyanhydride, a polyphosphazene, and a polyphosphoester.

11. The method according to claim 9, wherein the degradable polymeric materials are independently selected from the group consisting of: polylactic acid, polyglycolic acid, a polyhydroxybutyric acid, and a poly($\epsilon$-caprolactone).

12. The method according to claim 3, wherein the liquid resin is selected from the group consisting of: epoxy resin, phenolic resin, furan resin, and polysilicone.

13. The method according to claim 3, wherein the liquid resin is selected from the group consisting of: bisphenol A, bisphenol F, novolac epoxy resin, and aliphatic epoxy resin.

14. The method according to claim 3, additionally comprising introducing a hardener for the liquid resin, wherein the hardener is introduced simultaneously with the liquid resin or at least before flowing back any downhole fluid from the subterranean formation that contains the liquid resin.

15. The method according to claim 14, wherein the hardener is selected from the group consisting of: an amine, an anhyride, a phenol, and a thiol.

16. The method according to claim 14, wherein the hardener is selected from the group consisting of: diethylene triamine, ethylene diamine, and polyethylene imine.

17. The method according to claim 3, additionally comprising introducing a silane coupling agent for the liquid resin, wherein the silane coupling agent is introduced simultaneously with the liquid resin or before flowing back any downhole fluid from the subterranean formation that contains the liquid resin.

18. The method according to claim 17, wherein the silane coupling agent is selected from the group consisting of: an aliphatic silane, and an aromatic silane.

19. The method according to claim 3, wherein each of the first particulate, the second particulate, the third particulate, and the liquid resin are introduced into the treatment zone dispersed in one or more water-based treatment fluids.

20. The method according to claim 19, wherein at least one of the one or more treatment fluids comprises a viscosity-increasing agent.

21. The method according to claim 19, wherein at least one of the one or more treatment fluids that comprises the liquid resin additionally comprises an emulsifier.

22. The method according to claim 19, wherein the first particulate, second particulate, and third particulate are each in at least a sufficient amount in the one or more water-based treatment fluids to contribute to the formation of a first filtercake, a second filtercake, and a third filtercake, respectively, on a first surface of a first portion of the subterranean formation having the first matrix permeability, on a second surface of a second portion of the subterranean formation having the second matrix permeability, and a third surface of a third portion of the subterranean formation having the third matrix permeability, respectively.

* * * * *